United States Patent
Pieczul

(10) Patent No.: US 12,255,914 B2
(45) Date of Patent: Mar. 18, 2025

(54) CONTAINER ORCHESTRATION FRAMEWORK AWARE PORT SCANNING

(71) Applicant: Oracle International Corporation, Redwood Shores, CA (US)

(72) Inventor: Olgierd Stanislaw Pieczul, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 18/063,289

(22) Filed: Dec. 8, 2022

(65) Prior Publication Data
US 2024/0195829 A1 Jun. 13, 2024

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/205* (2013.01)

(58) Field of Classification Search
None
See application file for complete search history.

(56) References Cited

U.S. PATENT DOCUMENTS

| | | | |
|---|---|---|---|
| 8,099,786 B2 | 1/2012 | Maynard | |
| 9,438,634 B1 | 9/2016 | Ross et al. | |
| 11,805,136 B2 * | 10/2023 | Abraham | H04L 63/1416 |
| 11,822,672 B1 * | 11/2023 | Kravtsov | G06F 21/577 |
| 2017/0098072 A1 | 4/2017 | Stopel et al. | |
| 2017/0177877 A1 * | 6/2017 | Suarez | G06F 21/6218 |
| 2021/0382997 A1 * | 12/2021 | Yi | G06F 21/577 |
| 2022/0156380 A1 | 5/2022 | Pradzynski et al. | |
| 2022/0171856 A1 * | 6/2022 | Bhatt | G06F 21/52 |
| 2022/0237301 A1 * | 7/2022 | Godowski | G06F 21/53 |

OTHER PUBLICATIONS

"Container Image Vulnerability", VMware, Available Online at: https://docs.vmware.com/en/VMware-Carbon-Black-Cloud/services/carbon-black-cloud-user-guide/GUID-F0D03EC9-8BD2-4775-8A3B-02F8B45D6AA6.html, Accessed from Internet on Aug. 3, 2022, 1 page.
"Container Security User Guide", Qualys, Available Online at: https://www.qualys.com/docs/qualys-container-security-user-guide.pdf, Jul. 5, 2022, 39 pages.
"DevOps Security Automation", NeuVector, Available Online at: https://neuvector.com/solutions/devops-security-solutions/, Accessed from Internet on Aug. 3, 2022, 3 pages.
"Docker Security Scanning Guide 2022", Snyk, Available Online at: https://snyk.io/learn/docker-security-scanning/, 2022, pp. 1-7.
(Continued)

*Primary Examiner* — Jeffrey R Swearingen
(74) *Attorney, Agent, or Firm* — Invoke

(57) ABSTRACT

A scanner service can be configured to scan one or more nodes associated with a container management service. The container management service can be configured to manage a set of services by allocating managed containers associated with the set of services to the one or more nodes. The scanner service can be configured to identify vulnerabilities of processes running on the one or more nodes. The vulnerabilities can be attributed to the containers and/or the associated services rather than to the nodes. The scanner service is aware of the container management service and communicates vulnerabilities of associated containers.

20 Claims, 9 Drawing Sheets

(56) References Cited

OTHER PUBLICATIONS

"Managing Container Security with Container Scanning and More", Sysdig, Available Online at: https://sysdig.com/learn-cloud-native/container-security/docker-vulnerability-scanning/, Accessed from Internet on Aug. 3, 2022, 6 pages.
"NIST SP 800-190 Compliance", neuvector.com, Available Online at: https://neuvector.com/wp-content/uploads/2019/01/NeuVector-SP800-190-Report_Final1.pdf, 2019, pp. 1-12.
"Qualys Container Security Assessment and Response", Qualys, Available Online at: https://www.qualys.com/docs/2021/qsc/training/virtual/day-2-container-security/cs-qsc2021-slides.pdf, 115 pages.
"Scanning Container Images", VMware, Available Online at: https://docs.vmware.com/en/VMware-Carbon-Black-Cloud/services/carbon-black-cloud-user-guide/GUID-8767CC4B-475D-4678-95E1-FBABD4658E42.html, Accessed from Internet on Aug. 3, 2022, 2 pages.
"VM/PC Scanning Events", Qualys Customer Portal, Available Online at: https://success.qualys.com/support/s/article/000006137, Accessed from Internet on Aug. 3, 2022, 5 pages.
"VMware Carbon Black Container", Available Online at: https://www.vmware.com/no/products/carbon-black-cloud-container.html, Accessed from Internet on Aug. 3, 2022, 4 pages.

\* cited by examiner

CONTAINER ORCHESTRATION FRAMEWORK AWARE PORT SCANNING

BACKGROUND OF THE INVENTION

Services can be distributed to operate across multiple computing nodes. A container management service can be used to manage services by creating deployable containers having processes associated with a service on the computing nodes. Computing nodes can be scanned by a scanner service to detect vulnerabilities in the computing nodes, for example, in the processes running on the computing nodes.

BRIEF SUMMARY OF THE INVENTION

In some embodiments, a method for container orchestrate framework aware port scanning may include identifying, by a scanner service, a first node of one or more nodes associated with a container management service, the container management service configured to manage a set of services by allocating managed containers associated with the set of services to the one or more nodes, and the scanner service configured to identify vulnerabilities of processes running on the one or more nodes; determining, by the scanner service, a first container identifier associated with a first managed container; scanning, by the scanner service, the first managed container for vulnerabilities; determining, by the scanner service, a second container identifier associated with a second managed container; determining, by the scanner service, whether the first container identifier corresponds to the second container identifier; in accordance with determining that the first container identifier does not correspond to the second container identifier, scanning, by the scanner service, the second managed container for vulnerabilities; and in accordance with determining that the first container identifier corresponds to the second container identifier, determining, by the scanner service, to forgo scanning the second managed container.

In some embodiments, a system may include one or more nodes configured to run processes, a scanner service, a container management service configured to manage a set of services by allocating managed containerized processes associated with the set of services to the one or more nodes; wherein the scanner service is configured to identify a first node of one or more nodes associated with a container management service; determine a first container identifier associated with a first managed container; scan the first managed container for vulnerabilities; identify a second process running on a second open port; determine a second container identifier associated with a second managed container; determine whether the first container identifier corresponds to the second container identifier; in accordance with determining that the first container identifier does not correspond to the second container identifier, scan, by the scanner service, the second managed container for vulnerabilities; and in accordance with determining that the first container corresponds to the second container identifier, determine, by the scanner service, to forgo scanning the second managed container.

In some embodiments, one or more non-transitory computer-readable medium comprising computer-executable instructions that, when executed by one or more processors, cause the one or more processors to perform operations including identifying, by a scanner service, a first node of one or more nodes associated with a container management service, the container management service configured to manage a set of services by allocating managed containers associated with the set of services to the one or more nodes, and the scanner service configured to identify vulnerabilities of processes running on the one or more nodes; determining, by the scanner service, a first container identifier associated with a first managed container; scanning, by the scanner service, the first managed container for vulnerabilities; determining, by the scanner service, a second container identifier associated with a second managed container; determining, by the scanner service, whether the first container identifier corresponds to the second container identifier; in accordance with determining that the first container identifier does not correspond to the second container identifier, scanning, by the scanner service, the second managed container for vulnerabilities; and in accordance with determining that the first container identifier corresponds to the second container identifier, determining, by the scanner service, to forgo scanning the second managed container.

In any embodiments, any and all of the following features may be implemented in any combination and without limitation. The method/operations can also include determining, by the scanner service, a vulnerability associated with the first managed container. The method/operations can also include identifying, by the scanner service, a vulnerability associated with the first managed container. The method/operations can also include attributing, by the scanner service, the vulnerability to the first container identifier. The method/operations can also include sending, by the scanner service, a notification of the vulnerability to an architecture monitor associated with the scanner service, the architecture monitor configured to attribute the vulnerability to the first container identifier. The architecture monitor can be further configured to use the notification of the vulnerability to update a first service of the set of services to generate a second configuration of the first managed container. The architecture monitor can be further configured to use the notification of the vulnerability to update user interface that indicates that the vulnerability is associated with the first container identifier. Determining, by the scanner service, that the first process is running in a first managed container can also include determining, by the scanner service, that the first process is running in a first container; and determining, by the scanner service, that the first container is the first managed container by determining that the first container is managed by the container management service. The second managed container can be associated with the first node. The second managed container can be associated with a second node of the one or more nodes. The second open port can be on the first node. The second open port can be on a second node of the one or more nodes. The first container identifier can be indicative of a first container configuration of a first service of the set of services. The scanner service can be further configured to determine a vulnerability associated with the first managed container. The scanner service can be further configured to attribute the vulnerability to the first container identifier. The scanner service can be further configured to send a notification of the vulnerability to an architecture monitor associated with the scanner service, the architecture monitor configured to attribute the vulnerability to the first container identifier. The architecture monitor can be further configured to use the notification of the vulnerability to update a first service of the set of services to generate a second configuration of the first managed container.

DETAILED DESCRIPTION OF THE INVENTION

Figure 1:
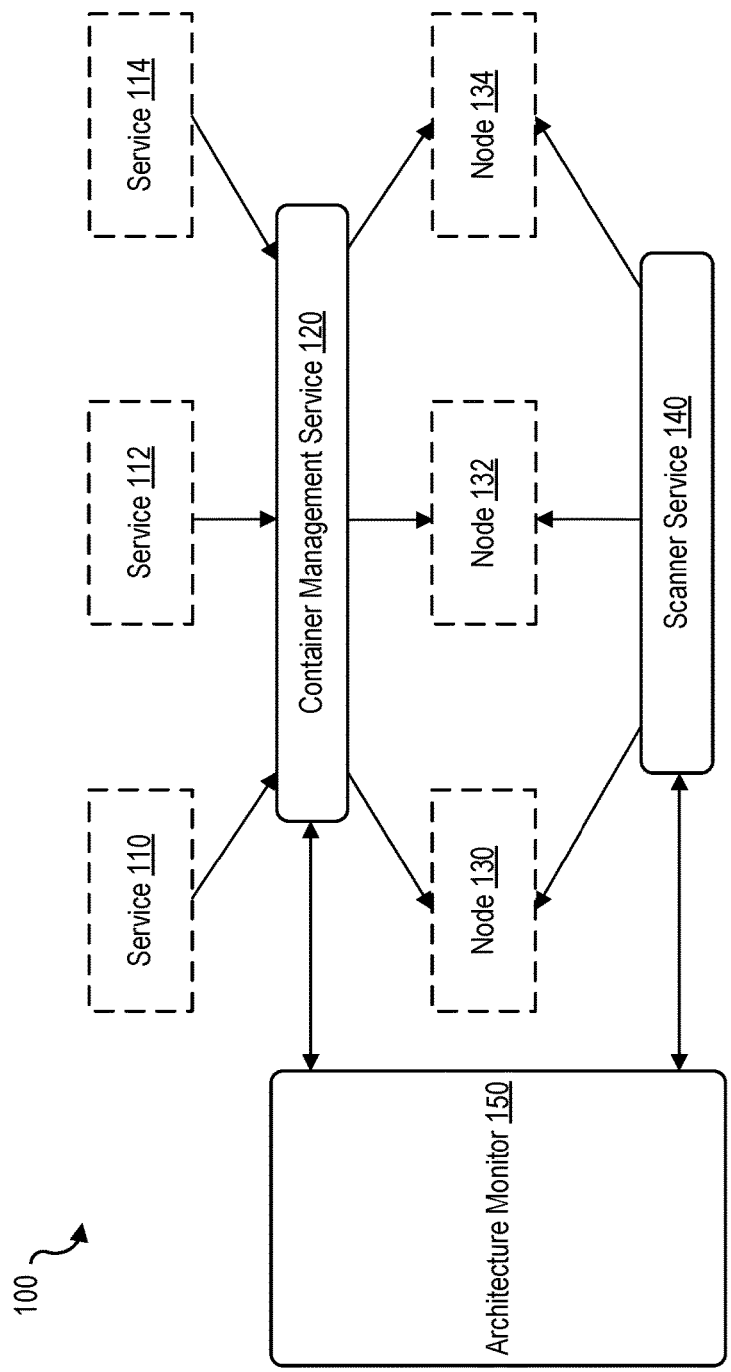
FIG. 1 illustrates a block diagram of high-level systems involved in scanning nodes, according to an embodiment of the present disclosure.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that provide techniques for scanning computing nodes that are configured to host containers associated with one or more computing services. Example computing nodes can be servers, computing devices, virtual machines, etc. Example computing services can be invoice services, order services, or services for managing user accounts. Computing services can also be microservices related to a single overarching application. Unlike conventional scanning techniques for detecting vulnerabilities in computer systems, the techniques described herein enable a scanner service to be aware of a container management service that distributes containers associated with services to nodes in a system. A scanner service that is aware of a container management service can be configured to attribute vulnerabilities in containers (for example, vulnerabilities in one or more processes executed in the container) to those particular containers, as opposed to the nodes running/hosting the containers. By knowing that the vulnerability lies in a particular container, proper diagnosis and updates to the container can be made. For example, the container management service can make a request for an updated version of the container, the updated version having patched the detected vulnerabilities. The scanner service can also avoid scanning containers with the same identity as previously scanned containers that may be on the same node or other nodes in the system.

In some examples, a system including the scanner service can be configured to include one or more nodes, a container management service, and a set of one or more services. A container management service (which can also be referred to as a container orchestration framework) can be used to dynamically allocate containers to the one or more nodes according to the resources available in the system and/or needed by the services. Resources such as bandwidth, processing power, capacity, demand, availability, and the like can be used in determining how to allocate the containers. The dynamic allocation of containers can lead to radically different moment-to-moment snapshots identifying which containers are running on any single node.

Containers can have identification information (for example, identifiers (IDs)) that can be used to identify the container's associated service, as well as configuration and version information of the container. Oftentimes, containers across multiple nodes or within the same node can have the same identification information. Containers can have the same identification information (for example, a container ID) even if recipient clients of the associated service are different. Containers can have the same identification if multiple containers on the same node are needed to provide the processing needs to their associated service.

Containers can be fully functional and portable computing environments (both cloud and non-cloud environments) surrounding processes such that the processes can be independent from other parallelly running environments. Each container can simulate a software application and/or processes in an isolated environment by bundling all related configuration files, libraries, and dependencies. Containers tend to be relatively lightweight and limited to executing the contained software application. One reason containers are considered lightweight is containers do not typically have their own operating system, but are deployed on systems with an operating system. This allows multiple containers to run on a single operating system instance. Due to the lightweight nature of containers, containers can be easily deployed, redeployed, and shut down, for example, by the container management service. On the other hand, virtual machines tend to be heavier software packages providing complete emulation of hardware devices (including low-level hardware devices like networking devices and central processing units or higher-level hardware like a stand-alone physical computer) on top of running any complementary software.

In some examples, a scanner service can begin scanning a node by scanning the ports on the node. When a scanner service determines that a port is open, the scanner service can then determine if the one or more processes running on the open port are hosted within containers (for example, they be containerized processes). Once the scanner service determines that there are containers running on the open port, the scanner service can determine whether those containers are managed by a container management service. Containers managed by a container management service can be referred to as managed containers. Any vulnerabilities or similar issues that are detected can be attributed to the managed containers such that proper troubleshooting of the service and/or related managed containers can be executed. Nonetheless, the status of processes on all ports of the node contribute to the health of the system. Any processes that are not in managed containers can be scanned by the scanner service. Most or all of these processes are node-specific processes that can reveal vulnerabilities of the particular node.

With regard to managed containers, the scanner service may determine the container ID. Once the scanner service determines the container ID of a managed container, the scanner service can determine if the scanner service has previously scanned the managed container. Containers with the same container ID are generally functionally the same and operate in the same way, such that a vulnerability detected in any container with a particular container ID is likely present in all containers with the same container ID. Similarly, if no vulnerabilities are detected in a container with a particular container ID, it is likely that those vulnerabilities are not in any containers with the same container ID. As such, the scanner service can move to scanning the next process, container, port, node, etc.

A scanner service that is aware of the container management service can properly identify vulnerabilities in the managed containers. This can lead to better allocation and use of resources for detection, diagnosis, and troubleshooting of vulnerabilities associated with the managed containers and respective services. Instead of attempting to troubleshoot nodes where container-related vulnerabilities are detected, the troubleshooting can be done on the containers themselves. This is especially useful because the dynamic allocation of containers by the container management service can lead to an allocation where a container with a detected vulnerability is no longer allocated to a particular node by the time the troubleshooting of that particular node can be conducted. The scanner service can also avoid scanning containers with the same identity as previously scanned containers that may be on the same node or other nodes in the system. This can increase the efficiency of resources used by the system.

Turning now to the figures, FIG. 1 illustrates an example block diagram 100 with example systems and components for implementing the scanning techniques described herein. One or more services (for example, services 110, 112, 114) work with a container management service 120 to dynamically allocate containers to one or more nodes (for example, nodes 130, 132, 134). The allocated containers are units configured to carry out and/or operate parts of the services. The nodes can be scanned by a scanner service 140 to detect vulnerabilities in the nodes. Scanner service 140 can scan the ports, the processes, and the containers of the nodes to detect vulnerabilities. Both the container management service 120 and the scanner service 140 can communicate with the architecture monitor 150. The scanner service 140 can report vulnerabilities it detects to the architecture monitor 150. The architecture monitor 150 can communicate the vulnerabilities to the container management service 120. The vulnerability information can be used to trouble-shoot the services and associated containers. Similarly, the vulnerability information can be used by the container management service 120 in its determination of dynamic allocation of containers associated with the services.

Figure 2:
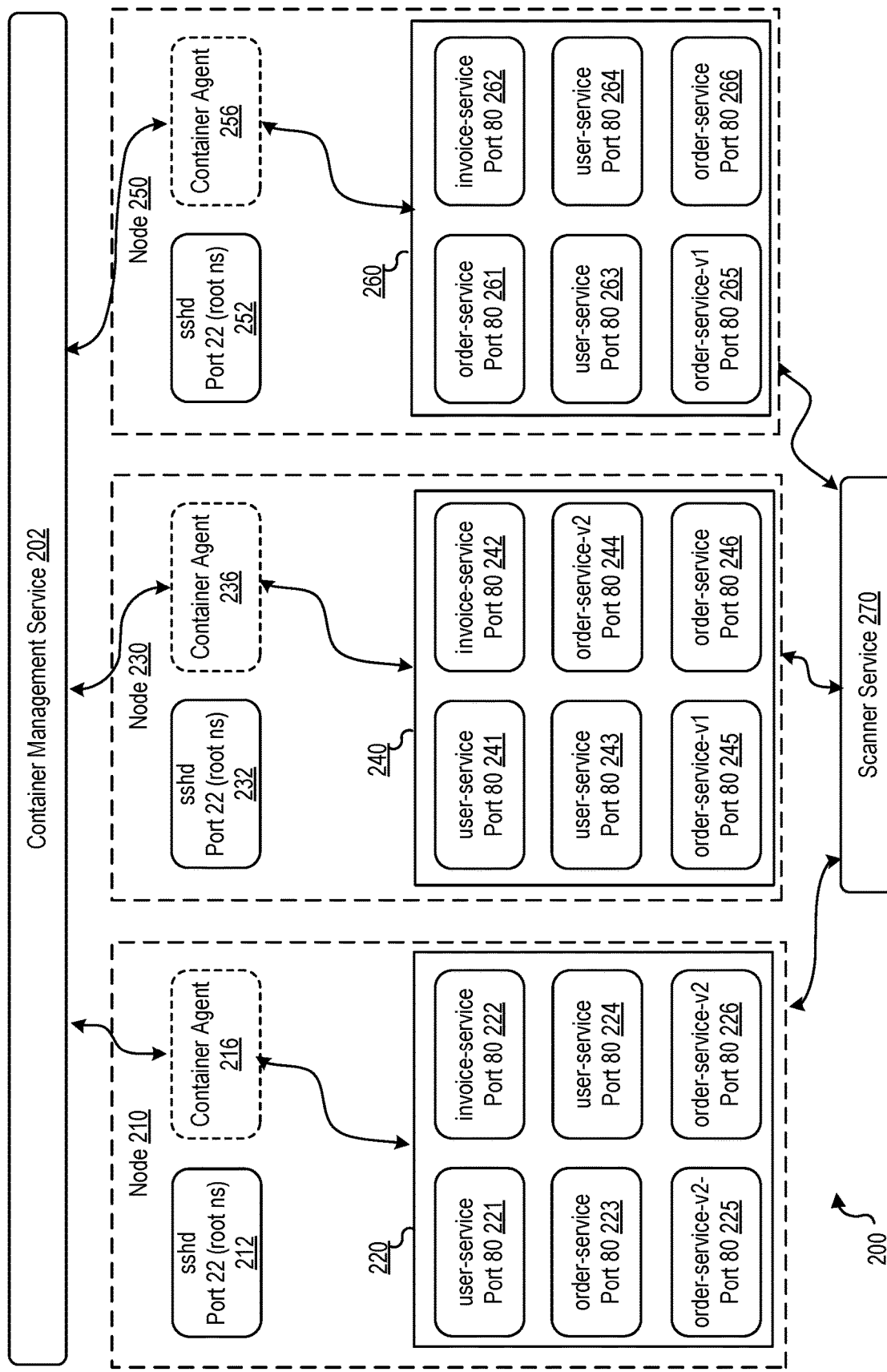
FIG. 2 illustrates a block diagram of systems involved in scanning nodes, according to an embodiment of the present disclosure.

Services 110, 112, 114 can be any type of computer-implemented service. The services are able to create, designate, or have another service create or designate, containers which can be allocated to nodes to carry out the services. In some implementations, the one or more services are microservices that are associated with a single application. The microservices represent smaller services or processes associated with the single application. For example, one microservice of an application could be related to an order microservice of the application while another microservice could be related to an invoice microservice as shown in FIG. 2. Similarly, another microservice could be related to a user service, for example a user management service.

Nodes 130, 132, 134 (which can also be referred to as hosts) can be configured to be platforms for hosting containers associated with services 110, 112, 114. Containers associated with services can be allocated to nodes by the container management service 120. Such containers and the processes in the container can be referred to as managed containers and managed processes. The container management service 120 dynamically allocates containers to run on the nodes based on capacity, demand, and availability requirements of the associated service (for example, services 110, 112, 114) and nodes. Containers can be allocated dynamically such that containers can be added and removed to optimize resource usage across the nodes and system. This dynamic allocation can lead to a container being allocated to a first node to run and then reallocated to a second node for further running without requiring the reaching of a natural endpoint to the processes of the container. Nodes also run local processes, of which some local processes can be in containers. Local processes can also be referred to as node-specific processes.

A scanner service 140 is used to scan nodes in order to detect vulnerabilities in the processes and containers hosted on the node. The scanner service 140 can scan the ports of a node and determine whether the port is being used by one or more processes (for example, the port is open). The scanner service 140 can then scan the ports to determine the processes running on the port. In some implementations, multiple processes can run on the same port. In some implementations, the node can use a system to make the processes appear to be running on the same port (for example, virtually run on the same port) even if the processes are running on different actual ports. In some implementations, the scanner reports and/or identifies ports and processes base on the virtual ports. In some implementations, the scanner reports and/or identifies ports and processes based on the actual ports.

The scanner service 140 can then identify if the processes running on the port are running in containers. Once the scanner service 140 has determined that one or more processes running on the port are running in a container, then the scanner service can determine if the one or more processes are associated with a managed container managed by the container management service 120. The scanner service 140 can scan ports, processes, and containers that are not associated with a managed container managed by the container management service 120 because processes not associated with a managed container are node-specific processes and may indicate vulnerabilities in the node. However, if the process is associated with a managed container, then the scanner service 140 determines if that particular managed container has been scanned previously by looking at the container ID of the managed container. If a managed container with the same container ID has been previously scanned, then the scanner service can determine that scanning the managed container is redundant as described herein. Scanning a managed container with the same container ID as a previously scanned managed container is redundant because containers with the same container ID are have essentially the same functionality.

The dynamic allocation of containers (and their related processes) can make the nodes and their associated operating systems disposable, such that nodes are temporary hosts for managed containers. As such, the scanning of containers on a node can lead to the identification of security vulnerabilities in the containers, but not necessarily in the node itself. For example, if a vulnerability is identified in a first managed container on a first node, but the first managed container is reallocated to a second node, then the vulnerability is no longer present on the first node. In this way, the scanner service 140 being aware of the container management service 120 allows attribution of vulnerabilities to particular containers and services rather than incorrectly attributing vulnerabilities to nodes who may no longer be hosting the vulnerable container. The scanner service 140 can communicate vulnerability information (for example, about the node or about a managed container on the node) to the architecture monitor 150.

The architecture monitor 150 can use the vulnerability information about a node or managed container in many ways. The architecture monitor 150 can provide (or send information to) a system and user interface (UI) for a system manager to identify, monitor, trouble-shoot, and otherwise manage vulnerabilities and other parts of the system. The architecture monitor 150 can also be used to communicate with any service, node, the container management service 120, or the scanner service 140 to request and send information (for example, vulnerability information) and/or communicate updates to any parts of the system requiring update.

In some implementations, the architecture monitor 150 can include a view on its UI that attributes vulnerabilities that are identified in managed containers to those containers as opposed to an underlying host node. The architecture monitor 150 can still attribute node-specific vulnerabilities to those nodes (for example, vulnerabilities in local processes or local containers) as well as described herein. The UI could also allow filtering for containers based on representative properties such as versions, user-defined labels, IDs, and the like. The filtering could be specific to particular container management services. Filters could also be used to aggregate issues by namespaces or clusters, which are higher order constructs of containers just as subnets and networks are higher order constructs of nodes. Having this scan information and filtering options allows for the forensic analysis of nodes and incidents involving nodes and managed containers.

FIG. 2 illustrates an example block diagram 200 of systems and components for implementing the scanning techniques described herein. FIG. 2 also illustrates an example snapshot of container allocation at a particular point in time. However, the allocation of containers is constantly updated by the container management service 202.

The container management service 202 can be the container management service 102 of FIG. 1. The nodes 210, 230, 250 can be the nodes 130, 132, and 134 of FIG. 1. The scanner service 270 can be the scanner service 140 of FIG. 1.

The container management service 202 can be configured to control and/or manage services to be deployed on nodes. For example, the container management service 202 deploys containers containing processes associated with the services to be deployed on nodes 210, 230, 250. Example containers include containers 221-226, 241-246, and 261-266. A scanner service 270 can scan the containers and processes on nodes 210, 230, 250 for vulnerabilities.

The container management service 202 can be configured to control and/or manage services to be deployed across multiple nodes. The container management service 202 can deploy containers associated with its managed services (for example, service 110 of FIG. 1) on nodes. The container management service 202 and a managed service can work together to determine what can be deployed in a container on a node on behalf of the managed service. In some implementations, the container management service 202 can determine the data to be deployed in a container for a service. In some implementations, the service provides the data (for example, processes, code, configuration information, etc.) to the container management service 202 to be deployed in a container to the container management service 202. A container can contain a process or collection of processes and related data. A container that is managed by the container management service 202 can be referred to as a managed container.

Nodes 210, 230, 250 can be any computing device that is used to run processes. For example, a node can be a server used to execute a service on behalf of another device. Some processes are not containerized and/or node-specific. Some processes can be containerized and node-specific such that these containerized processes are not managed by the container management service 202. Node-specific processes are processes that are not managed across multiple nodes, but are individual and specific to the node running them. Containerized processes are processes that have been developed to be containerized to enable certain functionality, however, the techniques described herein mostly pertain to managed containerized processes. Example solid-state hard drive (sshd) processes 212, 232, and 252 are examples of node-specific processes that may or may not be containerized.

Nodes 210, 230, 250 can also have groups 220, 240, 260 of managed containers. These groups 220, 240, 260 of managed containers (and the managed containers within the groups) are managed by the container management service 202 by the use of container agents 216, 236, 256 on the nodes 210, 230, 250. The container agents are used to start, stop, allocate, reallocate, and delete containers on the nodes.

FIG. 2 shows how container agents 216, 236, 256 allocate managed containers to example groups 220, 240, 260 such as example managed containers 221-126, 241-146, 261-166. A node can have multiple containers of the same configuration, for example node 210 has managed containers for user-service 221 and user-service 224 in the group 220 of managed containers. Containers with the same configuration can have the same container ID that can be used to identify the container's associated service, configuration information, and version information. Containers with the same configuration operate essentially the same. Container IDs can be determined in many different ways. In some implementations, systems may concatenate multiple types of configuration information to create a container ID. In some implementations, systems can assign a container ID arbitrarily. In some implementations, container IDs can be a hash of configuration information.

In some implementations, multiple containers of the same configuration can be used to scale up the amount of resources on a node used to handle the service associated with the containers. For example, order-service-v2 225 and order-service-v2 226 are containers with the same configuration and can be used to provide twice as many resources from node 210 (as compared to a single order-service-v2 container) to a single client, application, or system. In some implementations, containers with the same configuration that operate on behalf of the same client, application, service, or system have the same container ID.

In some implementations, containers with the same configuration can be used to provide the same service but for different clients or systems. For example, user-service 221 can be associated with a client A or system A while user-service 224 can be associated with a client B or system B. In some implementations, containers with the same configuration that operate on behalf of different clients, applications, services, or systems have the same container ID.

In some implementations, the container management service 202 can deploy multiple configurations and/or versions of containers associated with services. For example, node 230 can have a managed container for order-service 246 and another managed container for order-service-v1 245. The managed container for order-service-v1 245 can be different configuration of the managed container for order-service 246, for example, managed container for order-service-v1 245 could be an updated managed container. In some implementations, an updated managed container can be created in order to address vulnerabilities detected by the scanner service 270. In some implementations, the container management service 202 can update a container while the container is running on a node. In some implementations, the container management service 202 does not update a container while the container is running on a node. In some implementations, the container management service 202 does not deploy any old configurations and/or versions of containers once a new configuration and/or version has been approved for deployment. As old configurations and/or versions of containers run to some level of completion or are stopped, the container management system 202 can stop deploying the older configurations and/or versions of containers and instead deploy the new configurations and/or versions of containers.

The scanner service 270 scans nodes to detect vulnerabilities in the processes and containers hosted on the nodes. The scanner service can begin by identifying ports that are open (for example, running one or more processes). The scanner service 270 then determines if the process(es) running on the port are in containers (for example, the process(es) is containerized).

The scanner service 270 can be activated to scan nodes at predetermined intervals. The scanner service 270 can also scan a node with the highest time since last complete scan. The scanner service 270 can also be activated to scan nodes when a new configuration and/or version of a container has been assigned to the node. For example, node 230 may deploy a managed container for order-service-v2 244 which is the first time a managed container for order-service-v2 has been deployed. The scanner service can be activated to scan that node to determine any vulnerabilities associated with the new managed containers for order-service-v2.

Figure 3:
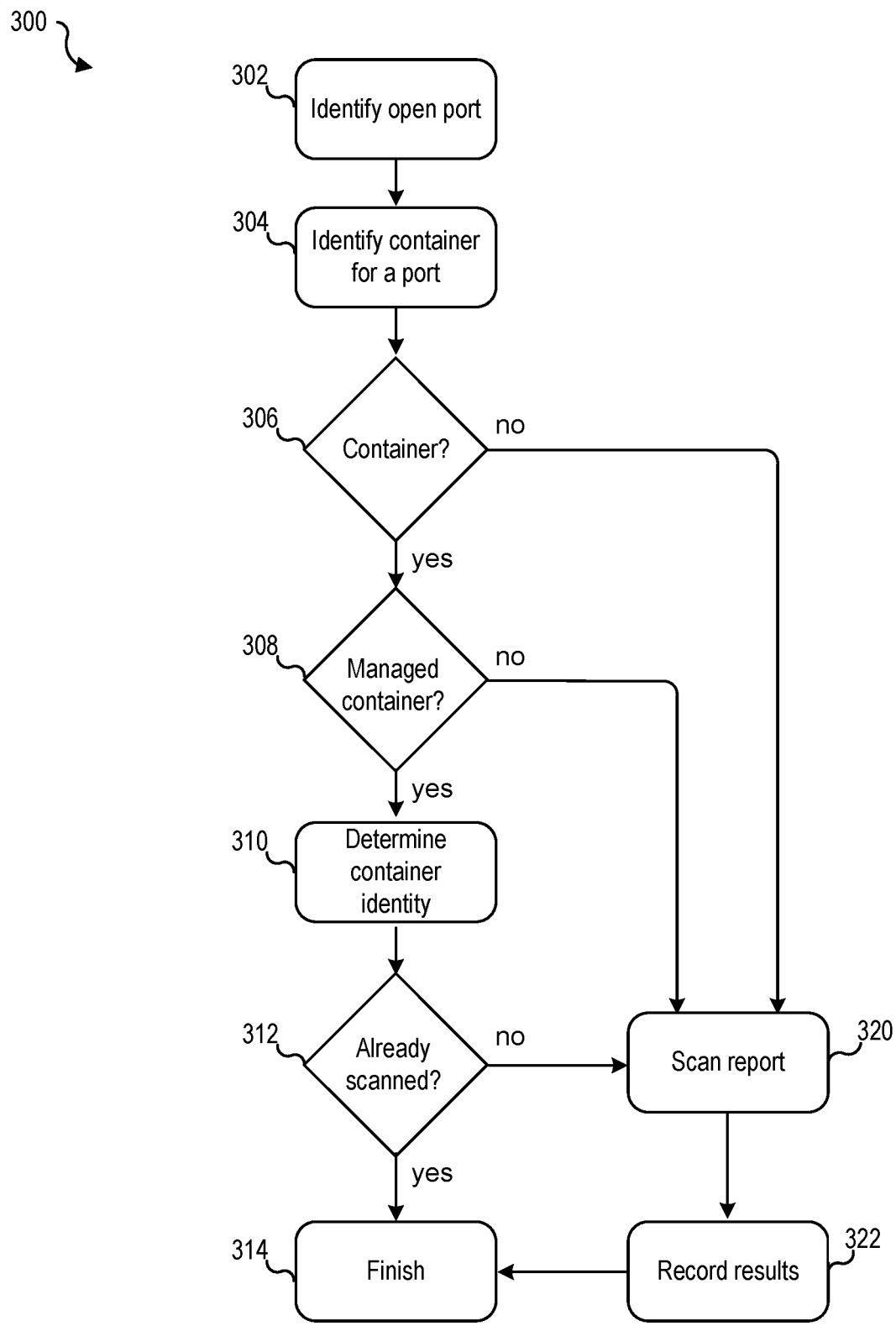
FIG. 3 illustrates a decision tree for scanning nodes, according to an embodiment of the present disclosure.

FIG. 3 illustrates a decision tree showing an example process 300 for implementing the scanning techniques described herein. Process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. The process 300 can be implemented on a scanner service, for example, the scanner service 140 of FIG. 1. Although process 300 will be described as being implemented by the scanner service, some or all parts of process 300 can be implemented by the architecture monitor 150 of FIG. 1.

At block 302, the scanner service identifies an open port on a node (for example, node 130 of FIG. 1). Open ports have processes running on them that can be scanned for vulnerabilities. At block 304, the scanner service can identify if the processes running on the port are in a container. There are many ways to determine if the processes running on a port are in a container as is well known in the art.

At block 306, the scanner service reaches a decision of whether the processes running on the port are in a container. If the processes are not running in a container, then the scanner service can scan the processes for vulnerabilities. In some implementations, processes not running in a container are node-specific processes that may contain vulnerabilities that can be associated with the node. In such cases, scanning the processes is an important step in detecting vulnerabilities.

Different platforms can have different ways of verifying if a process is running in a container. For example, in a Linux container platform, containers can use separate namespaces. Namespaces can be provided by a Linux kernel and allow isolation within a host or node. Containers can also have separate network, process, filesystem, and other namespaces. Namespaces can be used to indicate that a process is a process running in a container (also referred to as a containerized process). Additionally, the parent process of a process can be verified to be a containerized process which would make the process (the child of the parent process) also a containerized process. Other platforms may have different ways to identify which processes are containerized and verification/determination that a process is running in a container can adapt to all platforms.

If the processes on the port are determined to be running in a container, the scanner service proceeds to block 308. At block 308, the scanner service reaches a decision of whether the container is a managed container. If the container is determined to not be a managed container, then the scanner service can scan the container. In some implementations, containers that are not managed containers may contain vulnerabilities that can be associated with the particular node. In such cases, scanning the processes is an important step in detecting vulnerabilities.

In some implementations, the scanner service can access container runtime properties to determine if a container is running as part of a managed container. For example, in a Kubernetes environment, the scanner service can identify the parent process of a container as being a local Kubernetes management service (for example, a Kubernetes orchestrator). In some implementations, the scanner service can query the container management service to list managed containers and compare the list of managed containers to the containers running on a node at runtime. In some implementations, the scanner service will use pluggable modules to handle container attribution for different container management services (for example, orchestration frameworks for supported platforms).

At block 310, the scanner service can determine the container identity of the managed container. For example, the scanner service can determine the container ID of the managed container. Different container management systems (for example, the container management system 120 of FIG. 1) can have different ways of determining and/or assigning container IDs to managed containers as described herein.

In some implementations, container management services may be based on established frameworks. Identification of which containers have the same container ID can be determined based on high level resources defining the structures of containers in these frameworks. For example, the Kubernetes platform contains resources such as Deployment, Daemon, and StatefulSet. These higher level resources can be indicative of the container image, its version, open ports, secrets, configuration details, etc. These resources can be used as part of the container ID and to determine which containers have the same container IDs.

In some implementations, the scanner service is able to use and identify a parent object responsible for the container management of a node. For example, a parent object could be a Kubernetes cluster managed by cloud vendor x with identifier y. In some implementations, the identity of a container set is unique within a particular cluster.

In some implementations, certain nodes can be designated as having particular trustworthiness. For example, some nodes can be known as worker nodes that are part of known clusters with known properties. These nodes can be trusted to have managed containers that are indicative of other managed containers with the same container ID. In some implementations, the system can be configured to decide whether a node should be considered to be running managed containers. For example, a node that is considered to not be running managed containers will have all processes and/or ports scanned for vulnerabilities and the scanner service will not consider any new managed containers that are scanned on the particular node to be scanned for purposes of block 310.

At block 312, the scanner service determines if the scanner service has previously scanned a managed container with the container ID. If the scanner service has previously scanned a managed container with the container ID, presumably the scanner service has already detected the detectable vulnerabilities of the managed container. If the scanner service has not scanned a managed container with the container ID, the scanner service will scan the managed container for vulnerabilities. If the scanner service has scanned a managed container with the container ID, the scanner service will move on to the next port by proceeding to finish at block 314.

In some implementations, a scanner service can be configured to scan containers with the same container ID two or more times before determining to skip scanning the managed container. In some implementations, the scanner service can be configured to determine the scanner service has not scanned a managed container with a particular container ID for a period of time. If the determination that a managed container with a particular container ID has not been scanned for a period of time is made, the scanner service can scan the managed container. The scanner service can be configured to scan managed containers with the same container ID one or more times during regular time intervals.

At block 320, after the scanner service has scanned a process, container, or managed container, the scanner service can create a scan report. The scan report can be sent to an architecture monitor (for example, the architecture monitor 150 of FIG. 1). The scan report can include information about the process, container, managed container, associated service, the identified vulnerabilities, etc. In some implementations, at block 322, the scanner service can record the results of the scan for faster recall when scanning future processes, containers, and managed containers. Then the scanner service can proceed to finish at block 314 and proceed to scan the next port, node, etc.

Figure 4:
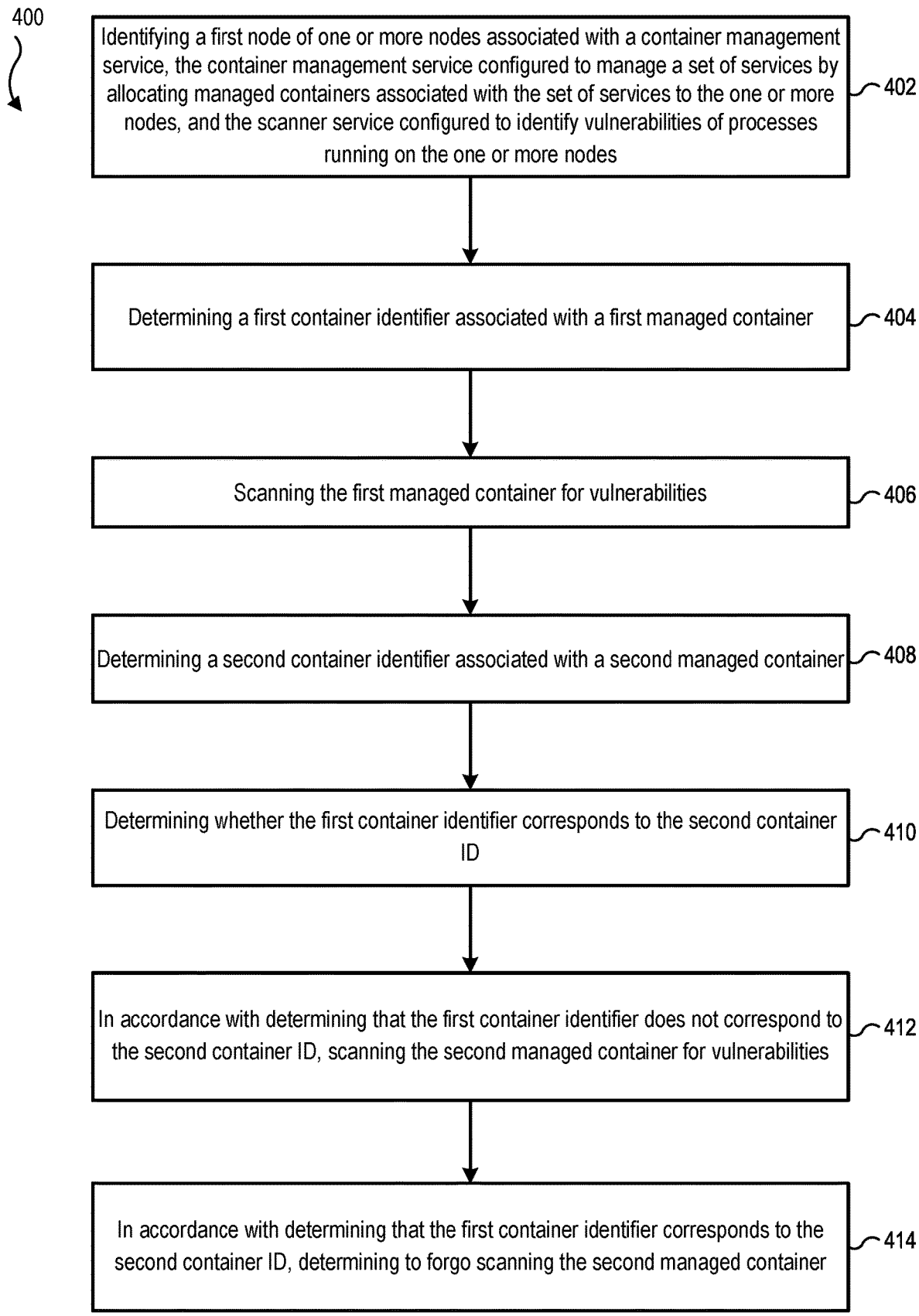
FIG. 4 illustrates a flow chart of a method for scanning nodes, according to an embodiment of the present disclosure.

FIG. 4 is a flow diagram illustrating an example method 400 for scanning nodes (for example, nodes 130, 132, 134 of FIG. 1) that have been allocated managed containers by a managed container service (for example, container management service 120 of FIG. 1), in accordance with at least one embodiment. In some embodiments, the parts or all of method 500 may be performed by a scanner service (for example, scanner service 140 of FIG. 1) and/or an architecture monitor (for example, architecture monitor 150 of FIG. 1).

The method 400 may begin at 402, where a first node of one or more nodes associated with a container management service is identified. The container management service can be configured to manage a set of services (for example, services 110, 112, 114 of FIG. 1) by allocating managed containers (for example, managed containers 221-226, 241-246, 261-266 of FIG. 2) associated with the set of services to the one or more nodes. The scanner service can be configured to identify vulnerabilities of processes running on the one or more nodes.

At 404, a first container identifier associated with a first managed container can be identified. The first managed container can be identified by scanning open ports on a node. The scanner can identify open ports and scan the open port to identify one or more processes running on the open port. The scanner can identify if the processes running on the open port are associated with a container (for example, a containerized process) or if the processes are non-containerized processes. The scanner can identify if the container is a managed container. The first container identifier can be indicative of a first container configuration of a first service of the set of services.

At 406, the first managed container can be scanned for vulnerabilities. Vulnerabilities can be associated with any process or multiple processes associated with the managed container. Vulnerabilities can relate to any flaws, bugs, security threats, or otherwise improperly functioning parts of any process, set of processes, container, or service. A vulnerability associated with the first managed container can be identified and/or determined. A vulnerability can be attributed to the first managed container. A notification of the vulnerability can be sent to the architecture monitor associated with the scanner service. The architecture monitor can be configured to attribute the vulnerability to the first managed container. The architecture monitor can be configured to use the notification of the vulnerability to update a first service of the set of services to generate a second configuration of the first managed container. The architecture monitor can be configured to use the notification of the vulnerability to update a user interface that indicates that the vulnerability is associated with a first container identifier.

At 408, a second container identifier associated with a second managed container can be identified. The second managed container can be identified by scanning open ports on a node. The second managed container can be operating on or appear to be operating on the same open port as the first managed container. The second managed container can be operating on the first node. The second managed container can be operating on a second node of the one or more nodes.

At 410, the first container identifier can be compared to the second container identifier to determine whether the first container identifier corresponds to the second container identifier. At 412, in accordance with determining that the first container identifier does not correspond to the second container identifier, scanning the second managed container for vulnerabilities. The first container identifier can correspond to the second container identifier if the first container identifier is the same as the second container identifier. Similarly, the first container identifier can correspond to the second container identifier if the first container identifier has a component of the identifier that is the same as the corresponding component of the second container identifier. For example, the first container identifier and second container identifier can be comprised of 2 or more segments. In some implementations, if any segment of the first container identifier and the corresponding segment of the second container identifier are the same then the first container identifier can correspond to the second container identifier. At 414, in accordance with determining that the first container identifier corresponds to the second container identifier by the scanner service, to forgo scanning the second managed container.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
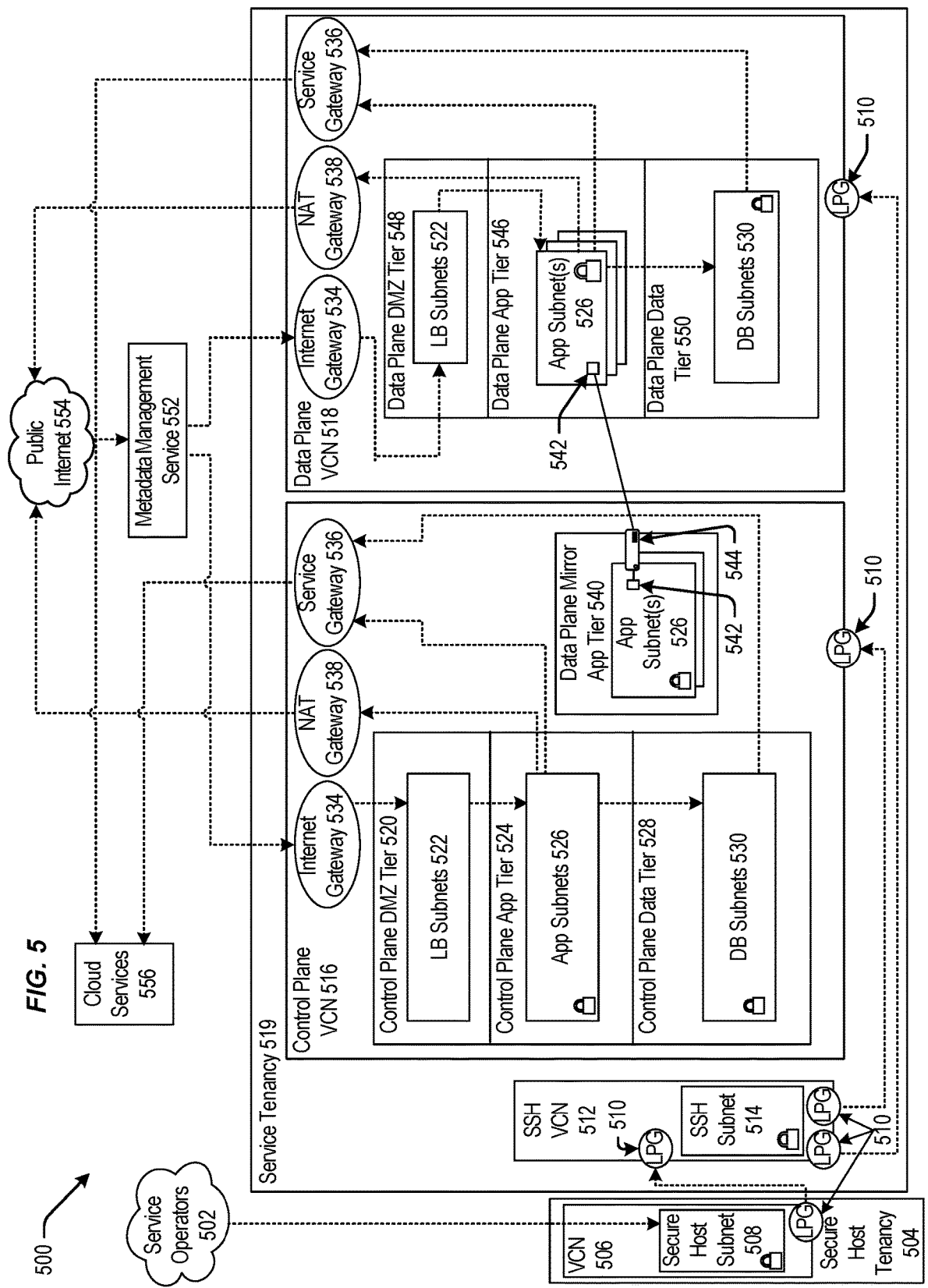
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
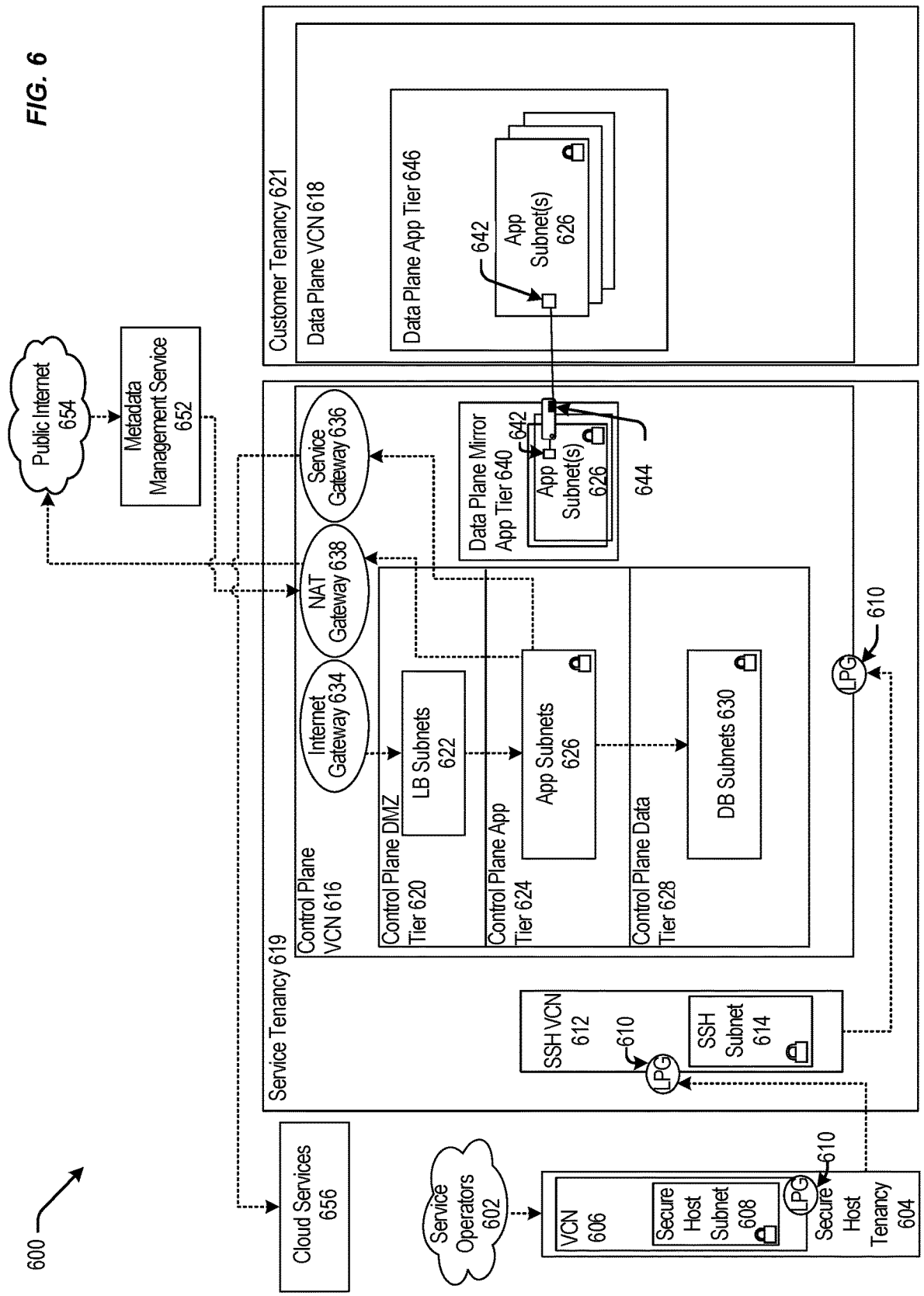
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 610 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
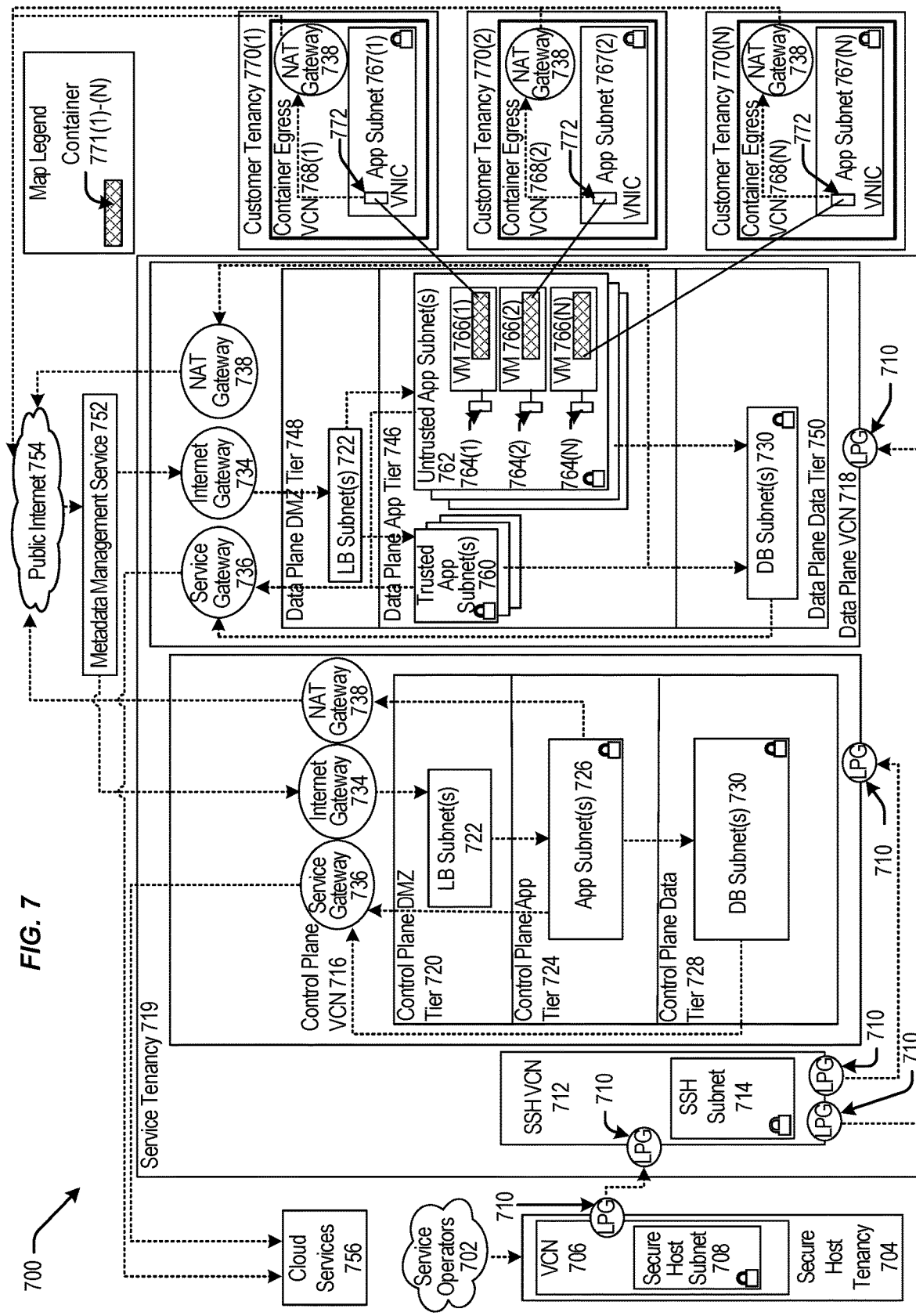
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
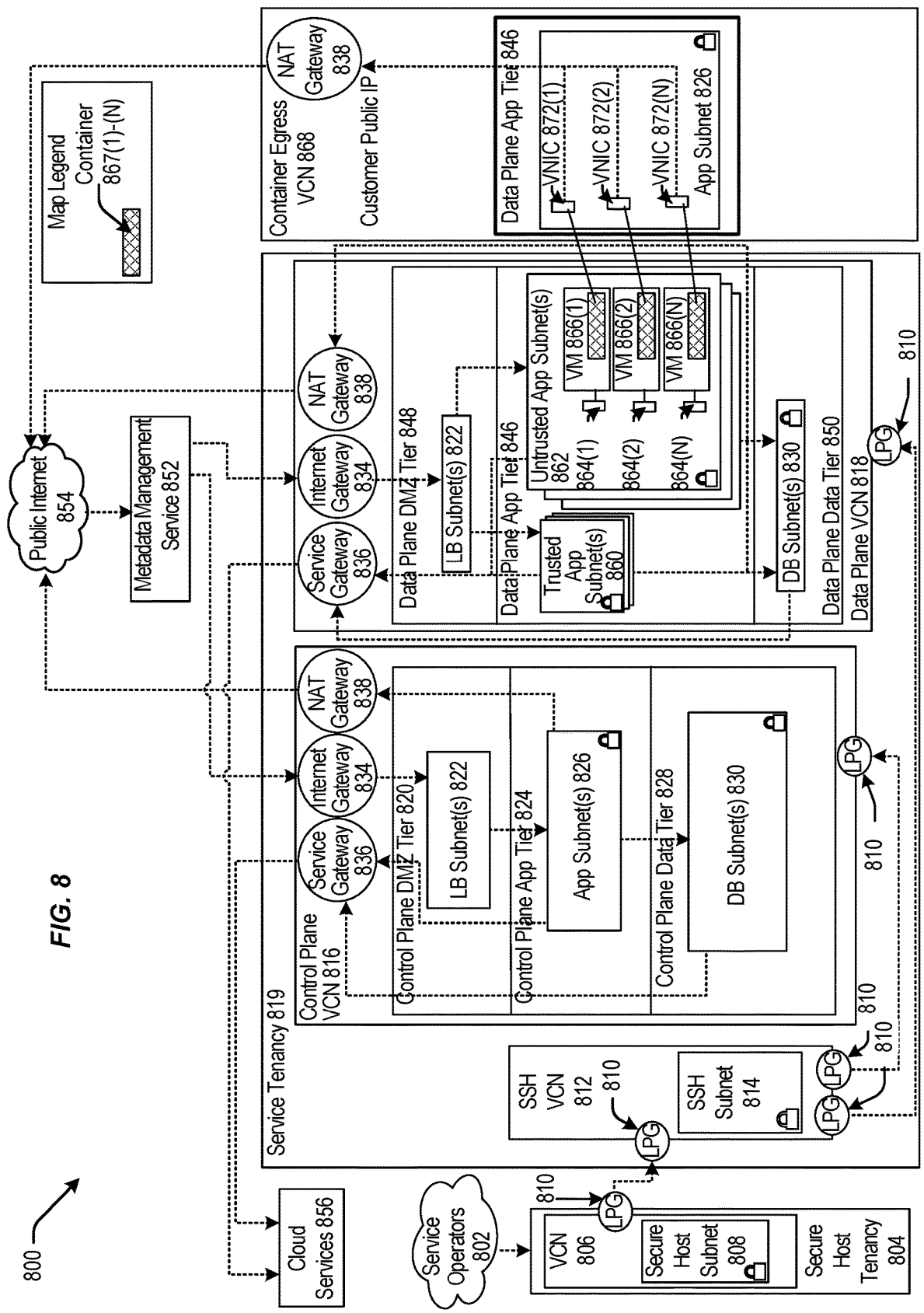
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
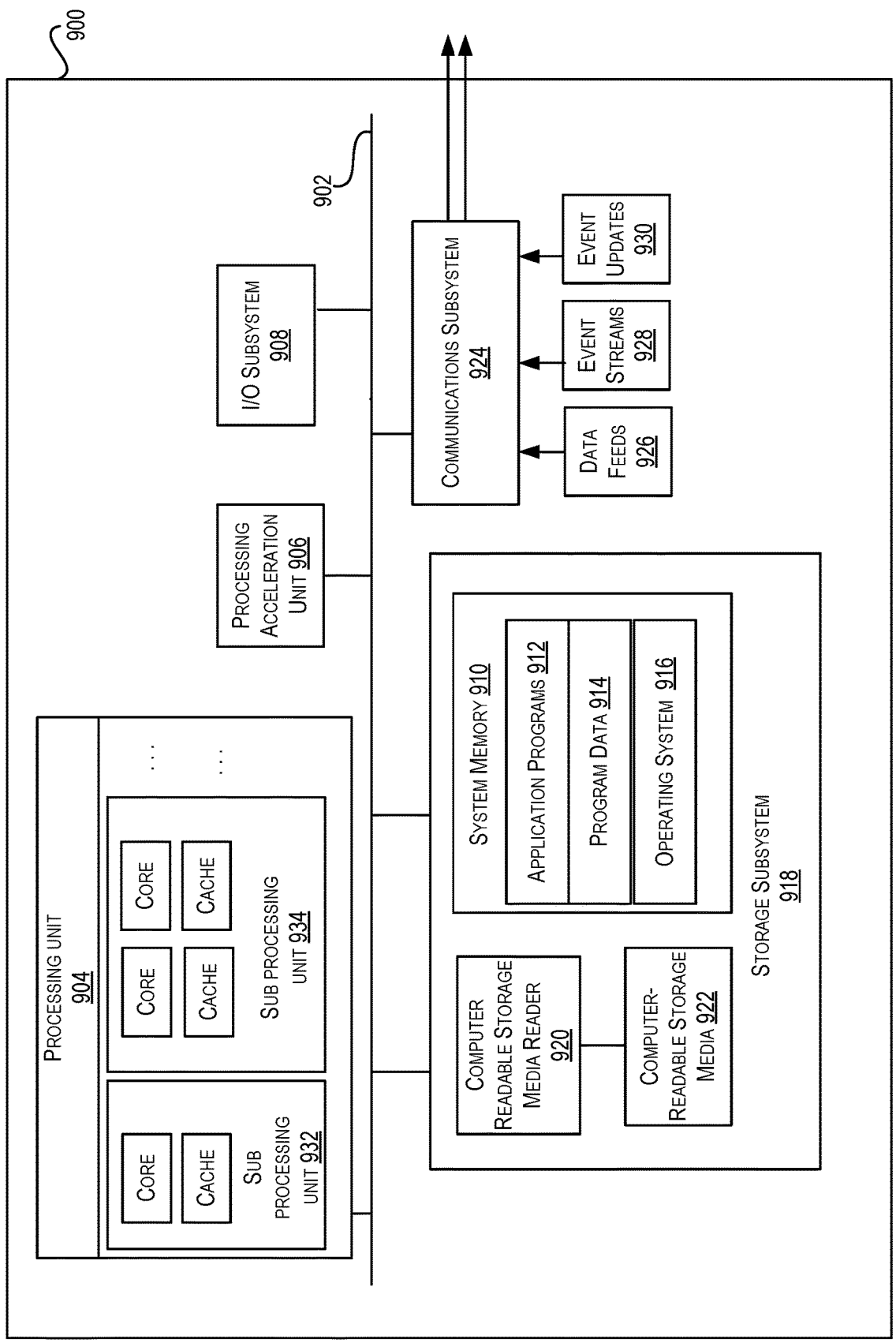
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    identifying, by a scanner service, a first managed container;
    scanning, by the scanner service, the first managed container for vulnerabilities;

generating a first scan result comprising a first set of information obtained by scanning the first managed container for vulnerabilities;
identifying, by the scanner service, a second managed container;
determining, by the scanner service, that the first managed container and the second managed container correspond to respective instances of a same container; and
in accordance with determining that the first managed container and the second managed container correspond to respective instances of the same container, determining, by the scanner service, to forgo scanning the second managed container; and
responsive to determining to forgo scanning the second managed container, attributing to the second managed container, the first scan result comprising the first set of information obtained by scanning the first managed container for vulnerabilities.

2. The method of claim 1, further comprising:
identifying, by the scanner service, a vulnerability associated with the first managed container based on the first scan result, wherein attributing the first scan result to the second managed container comprises attributing, to the second managed container, the vulnerability associated with the first managed container.

3. The method of claim 2, further comprising:
responsive at least in part to identifying the vulnerability associated with the first managed container, modifying a configuration of at least one of: the first managed container or the second managed container.

4. The method of claim 2, further comprising:
generating a notification of the vulnerability for display on a user interface, wherein the notification indicates that the vulnerability is associated with at least one of: the first managed container or the second managed container.

5. The method of claim 1, further comprising:
allocating, by a container management service, the first managed container to a first node of the container management service; and
allocating, by the container management service, the second managed container to a second node of the container management service,
wherein the first managed container executes a first portion of a process on the first node, and
wherein the second managed container executes a second portion of the process on the second node.

6. The method of claim 1, wherein determining that the first managed container and the second managed container correspond to respective instances of the same container comprises:
determining a first container identifier corresponding to the first managed container;
determining a second container identifier corresponding to the second managed container; and
determining that the first container identifier corresponds to the second container identifier.

7. The method of claim 1, further comprising:
identifying by the scanner service, a third managed container;
determining, by the scanner service, that the third managed container differs from the first managed container; and
in accordance with determining that the third managed container differs from the first managed container, scanning, by the scanner service, the third managed container for vulnerabilities;
generating a second scan result comprising a second set of information obtained by scanning the third managed container for vulnerabilities, wherein the second scan result differs from the first scan result.

8. The method of claim 1, further comprising:
identifying a vulnerability associated with a first instance of a first process located in a third managed container;
determining that a second instance of the first process is located in a fourth managed container;
responsive to determining that the second instance of the first process is located in the fourth managed container, attributing the vulnerability to the fourth managed container.

9. A system, comprising:
one or more nodes configured to run processes;
a scanner service;
a container management service configured to manage a set of services by allocating managed containerized processes associated with the set of services to the one or more nodes;
wherein the scanner service is configured to perform operations comprising:
identifying a first managed container;
scanning the first managed container for vulnerabilities;
generating a first scan result comprising a first set of information obtained by scanning the first managed container for vulnerabilities;
identifying a second managed container;
determining that the first managed container and the second managed container correspond to respective instances of a same container; and
in accordance with determining that the first managed container and the second managed container correspond to respective instances of the same container, determining to forgo scanning the second managed container; and
responsive to determining to forgo scanning the second managed container, attributing to the second managed container, the first scan result comprising the first set of information obtained by scanning the first managed container for vulnerabilities.

10. The system of claim 9, wherein the operations further comprise:
identifying a vulnerability associated with the first managed container based on the first scan result, wherein attributing the first scan result to the second managed container comprises attributing, to the second managed container, the vulnerability associated with the first managed container.

11. The system of claim 10, wherein the operations further comprise:
responsive at least in part to identifying the vulnerability associated with the first managed container, modifying a configuration of at least one of: the first managed container or the second managed container.

12. The system of claim 10, wherein the operations further comprise:
responsive at least in part to identifying the vulnerability associated with the first managed container, modifying a configuration of at least one of: the first managed container or the second managed container.

13. One or more non-transitory computer-readable storage media comprising computer-executable instructions that, when executed by one or more processors, cause performance of operations comprising:

identifying, by a scanner service, a first managed container;
scanning, by the scanner service, the first managed container for vulnerabilities;
generating a first scan result comprising a first set of information obtained by scanning the first managed container for vulnerabilities;
identifying, by the scanner service, a second managed container;
determining, by the scanner service, that the first managed container and the second managed container correspond to respective instances of a same container; and
in accordance with determining that the first managed container and the second managed container correspond to respective instances of the same container, determining, by the scanner service, to forgo scanning the second managed container; and
responsive to determining to forgo scanning the second managed container, attributing to the second managed container, the first scan result comprising the first set of information obtained by scanning the first managed container for vulnerabilities.

14. The one or more non-transitory computer-readable storage media of claim 13, wherein the operations further comprise:
identifying a vulnerability associated with the first managed container based on the first scan result, wherein attributing the first scan result to the second managed container comprises attributing, to the second managed container, the vulnerability associated with the first managed container.

15. The one or more non-transitory computer-readable storage media of claim 14, wherein the operations further comprise:
generating a notification of the vulnerability for display on a user interface, wherein the notification indicates that the vulnerability is associated with at least one of: the first managed container or the second managed container.

16. The one or more non-transitory computer-readable storage media of claim 14, wherein the operations further comprise:
responsive at least in part to identifying the vulnerability associated with the first managed container, modifying a configuration of at least one of:
the first managed container or the second managed container.

17. The one or more non-transitory computer-readable storage media of claim 13, wherein determining that the first managed container and the second managed container correspond to respective instances of the same container comprises:
determining a first container identifier corresponding to the first managed container;
determining a second container identifier corresponding to the second managed container; and
determining that the first container identifier corresponds to the second container identifier.

18. The one or more non-transitory computer-readable storage media of claim 13, wherein the operations further comprise:
identifying by the scanner service, a third managed container;
determining, by the scanner service, that the third managed container differs from the first managed container; and
in accordance with determining that the third managed container differs from the first managed container, scanning, by the scanner service, the third managed container for vulnerabilities;
generating a second scan result comprising a second set of information obtained by scanning the third managed container for vulnerabilities, wherein the second scan result differs from the first scan result.

19. The one or more non-transitory computer-readable storage media of claim 13, wherein the operations further comprise:
identifying a vulnerability associated with a first instance of a first process located in a third managed container;
determining that a second instance of the first process is located in a fourth managed container;
responsive to determining that the second instance of the first process is located in the fourth managed container, attributing the vulnerability to the fourth managed container.

20. The one or more non-transitory computer-readable storage media of claim 13, wherein the operations further comprise:
allocating the first managed container to a first node of a container management service; and
allocating the second managed container to a second node of the container management service,
wherein the first managed container executes a first portion of a process on the first node, and
wherein the second managed container executes a second portion of the process on the second node.

* * * * *